US010242360B2

(12) United States Patent
Brotsky et al.

(10) Patent No.: US 10,242,360 B2
(45) Date of Patent: Mar. 26, 2019

(54) DATA PROTECTION SYSTEM FOR ONLINE DATA

(71) Applicant: Adobe Inc., San Jose, CA (US)

(72) Inventors: Daniel C. Brotsky, Berkeley, CA (US); Michael Brian Orr, Indianola, WA (US); Shyama P. Padhi, Union City, CA (US)

(73) Assignee: Adobe Inc., San Jose, CA (US)

( * ) Notice: Subject to any disclaimer, the term of this patent is extended or adjusted under 35 U.S.C. 154(b) by 440 days.

(21) Appl. No.: 14/875,272

(22) Filed: Oct. 5, 2015

(65) Prior Publication Data
US 2017/0098215 A1     Apr. 6, 2017

(51) Int. Cl.
| | | |
|---|---|---|
| *G06Q 30/00* | (2012.01) | |
| *G06Q 20/38* | (2012.01) | |
| *G06Q 20/40* | (2012.01) | |
| *G06Q 30/06* | (2012.01) | |
| *G06F 21/62* | (2013.01) | |
| *G06Q 50/26* | (2012.01) | |

(52) U.S. Cl.
CPC ....... *G06Q 20/382* (2013.01); *G06F 21/6245* (2013.01); *G06F 21/6254* (2013.01); *G06Q 20/3821* (2013.01); *G06Q 20/40* (2013.01); *G06Q 20/401* (2013.01); *G06Q 30/0609* (2013.01); *G06Q 50/265* (2013.01); *H04L 2463/102* (2013.01)

(58) Field of Classification Search
CPC .................................................. G06Q 20/382
See application file for complete search history.

(56) References Cited

U.S. PATENT DOCUMENTS

| | | | | |
|---|---|---|---|---|
| 2012/0259877 A1* | 10/2012 | Raghunathan | ...... | G06F 21/6254 707/757 |
| 2012/0276845 A1* | 11/2012 | Wikander | ............ | G06Q 20/127 455/41.1 |
| 2013/0198080 A1* | 8/2013 | Anderson | .......... | G06Q 20/3821 705/44 |
| 2013/0254829 A1* | 9/2013 | Jakubowski | ............ | G06F 21/53 726/1 |

(Continued)

OTHER PUBLICATIONS

Roy, Souvik, Online Payment System Using Steganography and Visual Cryptology, 2014 IEEE Students' Conference on Electrical, Electronics, and Computer Science (Year: 2014).*

*Primary Examiner* — William J Allen
*Assistant Examiner* — Timothy J Kang
(74) *Attorney, Agent, or Firm* — Wolfe-SBMC (57) ABSTRACT

A data protection system for online data is described that can be used to obfuscate sensitive data to relieve security compliance requirements for one or more entities involved in processing, storing, and/or communicating the sensitive data to complete an online purchase transaction. The data protection system can receive online purchase data from a client application, and then remove the sensitive information of the online purchase data to sanitize the online purchase data. The data protection system can also maintain the sensitive information, and communicate the sanitized online purchase data to an eCommerce server that then communicates with a payment service provider for payment authorization of the online purchase, where the sanitized online purchase data relieves security compliance requirements at the eCommerce server.

20 Claims, 6 Drawing Sheets

(56) References Cited

U.S. PATENT DOCUMENTS

| | | | |
|---|---|---|---|
| 2013/0278622 A1* | 10/2013 | Sun | G06Q 20/22 |
| | | | 345/589 |
| 2014/0337238 A1* | 11/2014 | Leighton | G06F 21/602 |
| | | | 705/71 |
| 2015/0074392 A1* | 3/2015 | Boivie | G06F 21/602 |
| | | | 713/164 |
| 2016/0275493 A1* | 9/2016 | Mathew | G06Q 20/3674 |

* cited by examiner

DATA PROTECTION SYSTEM FOR ONLINE DATA

BACKGROUND

Data communications between computers can include exchanging data that is subject to security compliance requirements, such as for online purchase transactions that involve credit card data. For instance, the computers involved in the exchange of the credit card data are required to meet particular security compliance requirements regarding processing, storing, and/or transmitting of the data. To comply with the security requirements, owners of the computers incur expenses by purchasing software and/or hardware solutions, or by hiring a vendor that handles the data in compliance with the security requirements. Protecting the data from a security threat typically involves incurring ongoing expenses as new compliance requirements are identified.

In conventional online purchase scenarios, a client application facilitates purchasing a product or service from an eCommerce server by exchanging information. In some instances, the client application sends credit card information to the eCommerce server to complete the purchase. Accordingly, the eCommerce server is required to comply with industry security standards relating to processing, storing, and/or transmitting the credit card information. The client application may also send the credit card information directly to a payment service provider for authorization of the credit card information. Alternatively, the eCommerce server can send the credit card information to the payment service provider for authorization. In this way, the payment service provider is also required to comply with the industry security standards to protect the integrity of the credit card information. Thus, in conventional online purchase scenarios, owners of the eCommerce server and payment service provider must incur expenses to comply with the industry security standards.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

A data protection system for online data is described that facilitates to obfuscate sensitive data while relieving security compliance requirements for one or more entities involved in processing, storing, and/or communicating the sensitive data to complete an online purchase transaction. The data protection system can receive online purchase data from a client application, and then remove the sensitive information of the online purchase data to sanitize the online purchase data. The data protection system can also maintain the sensitive information, and communicate the sanitized online purchase data to an eCommerce server that then communicates with a payment service provider for payment authorization of the online purchase, where the sanitized online purchase data relieves security compliance requirements at the eCommerce server.

In embodiments, the data protection system can sanitize online purchase data prior to the online purchase data being communicated to an eCommerce server involved in the online purchase. The data protection system can also communicate the sanitized online purchase data to the eCommerce server, and provide payment authorization for the online purchase data based, at least in part, on receiving a response from a payment service provider, where the payment authorization is provided without requiring that the eCommerce server and the payment service provider be reconfigured to meet the security compliance requirements for processing, storing, and/or communicating the online purchase data.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

A data protection system is described that facilitates to obfuscate sensitive data to relieve security compliance requirements for one or more entities involved in processing, storing, and/or communicating of the sensitive data to complete an online purchase transaction. The data protection system can receive online purchase data from a client application, and then remove the sensitive information of the online purchase data to sanitize the online purchase data. The data protection system can also maintain the sensitive information, and communicate the sanitized online purchase data to an eCommerce server that then communicates with a payment service provider for payment authorization of the online purchase, where the sanitized online purchase data relieves security compliance requirements at the eCommerce server.

In embodiments, the data protection system can sanitize online purchase data prior to the online purchase data being communicated to an eCommerce server involved in the online purchase. The data protection system can also communicate the sanitized online purchase data to the eCommerce server, and provide payment authorization for the online purchase data based, at least in part, on receiving a response from a payment service provider, where the payment authorization is provided without requiring that the eCommerce server and the payment service provider be reconfigured to meet the security compliance requirements for the online purchase data.

The data protection system sanitizes online data by isolating and/or removing sensitive information included in the online data. The sensitive information may include personal information, financial information, information about a purchase, medical records, and/or proprietary information. In one specific example, the sensitive information includes credit card information such as a credit card number, card verification codes (e.g., CVV numbers), and an expiration date. Sanitizing the online data at the data protection system may include replacing the sensitive information with obfuscated data that is a representation of the information being replaced. For optimal security and to reduce applicable security compliance requirements, storage of sensitive information at the data protection system may be limited to short time-durations (e.g., measurable in seconds or milliseconds) and/or stored in volatile memory. Further discussion of these features are discussed below with regard to FIGS. 2-6.

The data protection system is implemented to manage the online data in a variety of ways. Managing the online data can include receiving, sending, and/or redirecting communications among computing devices that handle the online data. In this way, the data protection system can be implemented to facilitate processing the online data through a variety of tasks, such as to process an online purchase request that includes credit card information. For instance, in an implementation that includes a purchase made from a client application, such as from a user's computer and/or mobile device, the data protection system intercepts online purchase data sent from the client application, removes sensitive credit card information from the online purchase data, and sends the sanitized purchase data to a server from which the purchase was made, such as an eCommerce server. Because the purchase data is sanitized prior to being received at the eCommerce server, security compliance requirements are reduced and/or removed at the eCommerce server. Thus, in one non-limiting example, the data protection system may be used to manage online purchase data to complete an online purchase with credit card information made via a client application.

Managing the online data by the data protection system can also include communicating data to a third-party service to facilitate task completion. For instance, completing the online purchase in the above example can include receiving a purchase authorization from a third party, such as a payment service provider. Instead of requiring that the client application communicate with the payment service provider directly, the data protection system is implemented to manage communications with the payment service provider on behalf of the client application and the eCommerce server. This in turn protects the client application from sending sensitive information directly to the payment service provider. This protection is provided by the data protection system transparently such that the client application is not aware that the sensitive information is being sent to the data protection system rather than directly to the payment service provider.

While the above example includes processing an online purchase request, the data protection system is implemented to facilitate processing a variety of tasks. For instance, depending on the type of sensitive information received, the data protection system can sanitize personal information in a document or form sent over the Internet prior to the form or document being received at its intended location, thereby protecting the personal information from the downstream locations. Another example task may include obfuscating sensitive financial information, medical records, and/or proprietary information in response to a client application sending such information to another entity over a computer network. In specific examples, obfuscating the sensitive information includes obfuscating one or more portions within the form or document.

Generally, the data protection system can be implemented as a web service available in the "cloud" over a computer network. The techniques implemented by the data protection system can be applied via the "cloud" to systems that are subject to security compliance. In one specific example, an eCommerce system may utilize the data protection system to reduce Payment Card Industry® Data Security Standards (PCI DSS) that govern the online purchase and are applicable to a client application and an eCommerce server, and in some instances, are also applicable to a payment service provider. Other systems that are subject to security compliance that can utilize the techniques enabled by the data protection system include financial and medical systems that process, store, and/or transmit sensitive information. Although each system may have a unique set of security compliance requirements, the data protection system is adaptable to protect sensitive data in these different systems.

Regardless of the security compliance requirements to be met by different systems, the data protection system can be implemented to reduce or relieve security compliance requirements at various entities, thereby saving expenses related to meeting compliance. Further, this reduction or relieving of the security compliance requirements at the various entities can occur without a change to the normal operation of the entities.

Additionally, implementing the data protection system enables security compliance requirements to be met at the various entities involved in processing, storing, and/or communicating of the sensitive data without requiring changes to the one or more entities. This enables the data protection system to be a 'drop-in' solution that does not require the one or more entities to be reconfigured, such as by a program developer. Accordingly, expenses to meet security compliance requirements at the various entities is mitigated.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
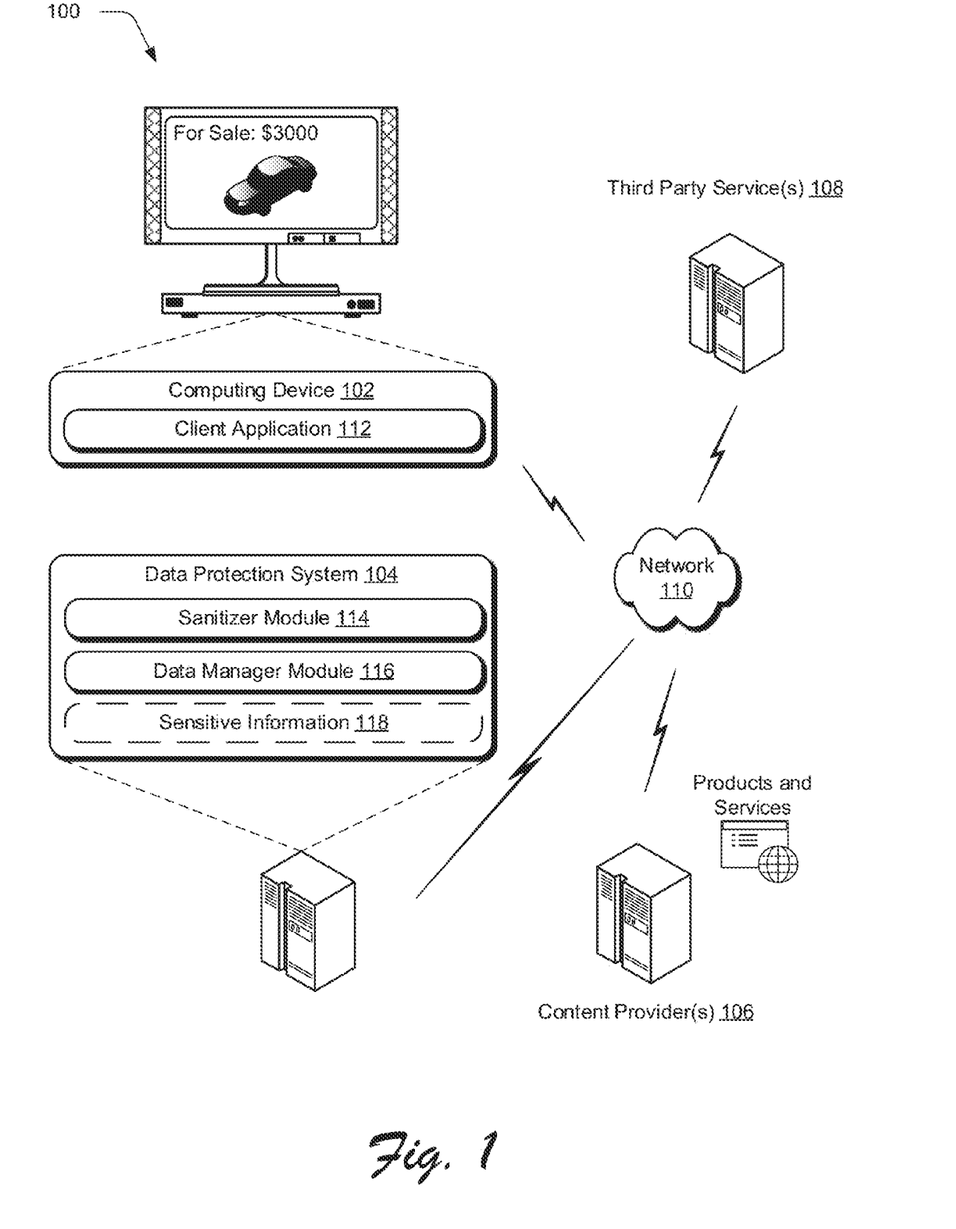
FIG. 1 is an illustration of an environment in an example implementation that is operable to employ techniques described herein.

FIG. 1 is an illustration of an environment 100 in an example implementation that is operable to employ techniques described herein. The illustrated environment 100 includes a computing device 102, a data protection system 104, a content provider 106, a third party service 108, and a network 110. As illustrated, the computing device 102 includes a client application 112, while the data protection system 104 implements a sanitizer module 114 and a data manager module 116. The data protection system 104, at times, can include sensitive information 118 that has been removed from online data, and as further described herein. The data protection system 104 may be implemented using one or more computing devices, e.g., a server farm, "in the cloud," and so on.

The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources, e.g., mobile devices. Additionally, although a single computing device 102 is shown, the computing device 102 may be representative of many different devices, such as multiple servers utilized by a business to perform operations "over the cloud" as further described in relation to FIG. 6.

The data protection system 104 is implemented to intercept, identify, de-identify, remove, add, and/or replace sensitive information from online data to relieve security compliance requirements at entities that process, store, and/or transform the sensitive information. The data protection system 104 can communicate over the network 110 with the computing device 102, the content provider 106, and the third-party service 108 to implement the described techniques. As described further with reference to FIGS. 2 and 3, the data protection system 104 is communicatively located between at least some of these entities via the network 110 to protect sensitive data or information from reaching at least some of these entities.

Various types of data may be sanitized by the data protection system 104 to enable cost savings related to the processing, the storing, and/or the transforming of the sensitive information 118. In one specific example, purchase data that includes sensitive information (e.g., credit card information) may be received from the client application 112 via the network 110. In this example, the purchase data is associated with a purchase for products and/or services from the content provider 106. In another example, personal data intended for the content provider 106 and/or the third-party service 108 is sanitized by the sanitizer module 114 of the data protection system 104 before the data protection system 104 forwards the sanitized data to its intended location. A variety of other examples are also contemplated, further discussion of which may be found in the following sections.

The data protection system 104 is further implemented to manage online data in a variety of ways. Managing the online data can include receiving, sending, and/or redirecting communications among computing devices that handle the online data. In this way, the data protection system 104 can be implemented to facilitate processing the online data through a variety of tasks, such as processing an online purchase request. Managing the online data by the data protection system 104 can also include communicating the online data to the third-party service 108 to facilitate task completion.

Generally speaking, the content provider 106 is implemented to make various resources (e.g., content, services, web applications, etc.) available over the network 110, such as the Internet, to provide a "cloud-based" computing environment and web-based functionality to clients. For instance, the content provider 106 may provide products and/or services to the computing device 102. In one specific example, the content provider 106 provides content, such as a form, to be filled out and returned via the client application 112. Sensitive information included in the form is intercepted by the data protection system 104 prior to the form being returned from the client application 112 to the content provider 106. Here, the content may be provided responsive to a request for a webpage, a search query, launching an application, or other activities performed in a user interface or browser, such as the client application 112.

In embodiments, the content provider 106 may utilize the third-party service 108. For instance, in the example when purchase data is sanitized, the content provider 106 may use the third-party service 108 to complete a purchase. In the above example in which personal data is sanitized, the content provider 106 can provide a service to the computing device 102, such as validating personal information in a document. Here, the third-party service 108 may provide the validation back to the computing device 102 via the data protection system 104 without the content provider 106 knowing which information in the document is being validated. By implementing the data protection system 104, security compliance to store, process, and/or transmit the information at the content provider 106 is relieved.

The third-party service 108 may be representative of a third-party service used by the computing device 102 and/or the content provider 106 to complete a task. The task may include completing a purchase by providing a purchase authorization, authorizing sensitive information, and/or validating sensitive information, just to name a few. In embodiments, the third-party service 108 is a different business entity from the content provider 106. In a conventional exchange, the content provider 106 may send sensitive information directly to the third-party service 108. The data protection system 104 removes the sensitive information 118 thereby providing an alternative to the content provider 106 sending any such information directly to the third-party service 108. Instead, the data protection system 104 ensures that the sensitive information 118 is sent to the third-party service 108. This can be accomplished, for instance, by intercepting data sent from the content provider 106, analyzing the intercepted content, identifying previously removed or obfuscated data, adding the identified data to a request, and sending the request to the third-party service 108. Further discussion of this example is provided in FIG. 3 below.

The network 110, meanwhile, represents any one or combination of multiple different types of wired and/or wireless networks, such as cable networks, the Internet, private intranets, and so forth. While FIG. 1 illustrates the computing device 102 communicating with the data protection system 104, the content provider 106, and/or the third-party service 108 over the network 110, the techniques may apply in any other networked or non-networked architectures.

The illustrated environment 100 further includes the client application 112 which can be utilized by the computer device 102 to facilitate an exchange of data with the data protection system 104, the content provider 106, and/or the third-party service 108. The client application 112 can include a web browser, for example. In one or more scenarios, functionality performed by the client application 112 may be implemented to be performed by a single entity, such as the computing device 102.

The sanitizer module 114 is representative of functionality to sanitize data received at the data protection system 104. In embodiments, the sanitizing can include removing, obfuscating, replacing, analyzing, identifying, and de-identifying sensitive information 118 included in the received data. Additionally or alternatively, the sanitizing can include applying cryptographic algorithms to obscure the data from interpretation by a human. Sanitizing the data at the data protection system 104 may also include replacing the sensitive information 118 with obfuscated data that is a representation of the information being replaced.

The sanitizer module 114 is further representative of functionality to analyze the data for which portions of the received data include sensitive information. For instance, in an example in which the received data is representative of a document, the document is analyzed to identify all the portions (e.g., fields, graphs, text, images, a combination thereof, etc.) of the document to be obfuscated.

In another example in which the received data is representative of a form, such as a form formatted in Adobe PDF®, fields are analyzed for sensitive information. Many types of portions can be specified as including sensitive information by a user, a developer, and/or a business entity. For instance, the sensitive information 118 can be specified via a user interface made available via the client application 112 and/or the content provider 106. By providing the sensitive information 118 to the sanitizer module 114, received data can be analyzed for the sensitive information 118 using common tools for analyzing data.

In embodiments, the sanitizer module 114 is made aware of which fields include sensitive information ahead of receiving data to be protected. In a specific implementation, the sensitive information to be analyzed is specified and provided to the sanitizer module 114 before receiving data for analysis and/or sanitation. For instance, the specified sensitive information can be provided to the data protection system 104 after completing an initialization process between the computing device 102 and/or the content provider 106, and the data protection system 104 so that after the initialization process, no changes are needed to the client application 112 and/or to the content provider 106 for the data protection system 104 to identify and sanitize the online data. It is contemplated, however, that receiving the specified sensitive information can be provided along with the online data to be analyzed and/or sanitized.

The sanitizer module 114 is further representative of functionality to determine a type of protection, and apply the protection to the sensitive information 118. Here, determining a type of protection can include selecting, from among a variety of obfuscating techniques, a particular obfuscating technique based on a task to be performed by the data protection system 104.

As shown in FIG. 1, the data manager module 116 is representative of functionality to manage data at the data protection system 104. In embodiments, managing the data includes intercepting, receiving, sending, and/or redirecting communications among the computing device 102 and/or the content provider 106.

Additionally or alternatively, the data manager module 116 provides functionality to communicate data to the third-party service 108 to facilitate task completion. For instance, completing a purchase can include receiving a purchase authorization from a third party. Instead of requiring that the computing device 102 communicate with the third-party service directly, the data protection system 104 is implemented to manage communications with the third-party service 108 on behalf of the computing device 102 and the content provider 106. This in turn protects the computing device 102 from sending sensitive information directly to the third-party service 108. This protection is provided by the data protection system 104 transparently such that the computing device 102 is not aware that the sensitive information 118 is being sent to the data protection system 104 rather than directly to the third-party service 108.

The data manager module 116 is also representative of functionality to store data at the data protection system 104, such as the sensitive information 118. For optimal security and to reduce applicable security compliance requirements, storage of sensitive information at the data protection system 104 may be limited to short time-windows (e.g., measurable in seconds or milliseconds) and/or volatile memory. Stored data may include data sent and/or received from the computer device 102, the content provider 106, and/or the third-party service 108. The period of time during which data is stored in memory can vary depending on an amount of time to complete a task. For instance, in an example task of completing a purchase, sensitive information may be stored upon removal from the online data, and be maintained in storage until a purchase authorization is provided, after which time the sensitive information is removed from memory. Thus, in this example the sensitive information may only be stored in memory for less than several seconds which greatly reduces security issues related to storing the sensitive information longer.

The sensitive information 118 may include personal information, financial information, information about a purchase, medical records, and/or proprietary information. In one specific example, the sensitive information 118 includes credit card information such as a credit card number, card verification codes (e.g., CVV numbers), and expiration date. In embodiments, the sensitive information 118 is received at the data protection system 104 from the computing device 102 and/or from the third-party service 108.

Additionally, although a single data protection system 104 is shown, the data protection system 104 may be representative of a plurality of different devices, such as multiple servers utilized by a business to perform operations "over the cloud" as further described with reference to FIG. 6. Thus, the data protection system 104 may be implemented as a web service "over the cloud" to implement the techniques described herein.

Figure 2:
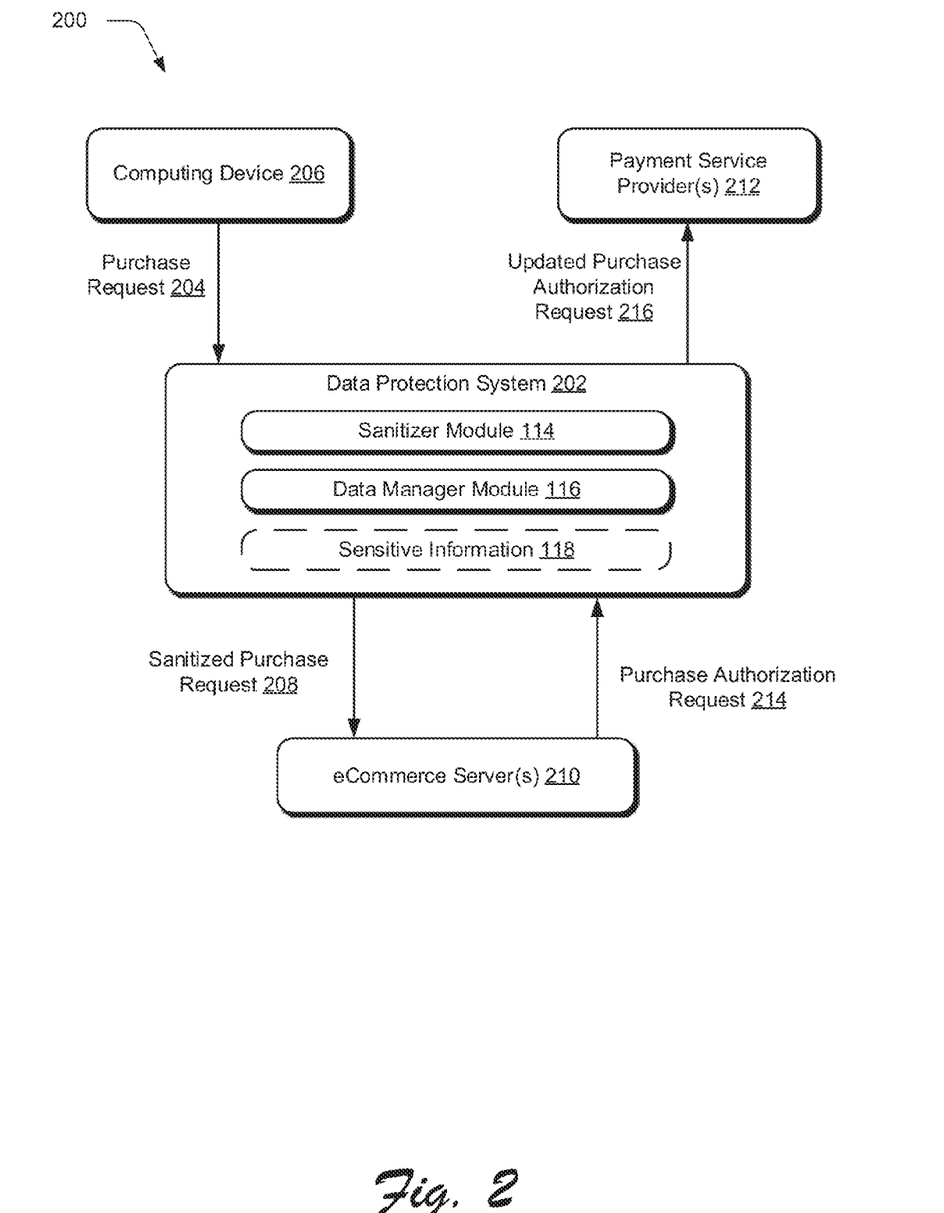
FIG. 2 depicts a representation of a scenario in an example implementation in which the data protection system sanitizes online purchase data included in a purchase request.

FIG. 2 depicts generally at 200 a representation of a scenario in an example implementation in which data protection system 202 sanitizes online purchase data included in a purchase request. As represented in FIG. 2, a purchase request 204 is received at the data protection system 202 from a computing device 206 responsive to an online purchase initiated at the computing device 206. Online purchase data included in the purchase request 204 is received at the data protection system 202 and sanitized by the sanitizer module 114. For instance, the sensitive information 118 is removed from the purchase request 204 and maintained in memory at the data protection system 202. The sensitive information included in the purchase request 204 may correspond to the descriptions of such information in FIG. 1 and elsewhere.

The data protection system 202 outputs a sanitized purchase request 208 to eCommerce server 210. Upon receiving the sanitized purchase request 208, the eCommerce server 210 initiates purchase authorization request 214. The data protection system 202 receives the purchase authorization request 214 from the eCommerce server 210 and adds the sensitive information 118 to generate an updated purchase authorization request 216. The data protection system 202 then communicates the updated purchase authorization request 216 to the payment service provider 212.

As shown in FIG. 2, the data protection system 202 is communicatively located between the computing device 206, the eCommerce server 210, and the payment service provider 212. This enables the data protection system 202 to manage communications between these entities. For instance, the data protection system 202 can intercept the purchase request 204 intended for the eCommerce server 210 and/or the purchase authorization request 214 intended for the payment service provider 212.

To sanitize the purchase request 204, the sanitizer module 114 removes the sensitive information 118 from the purchase request 204 completely such that the sanitized purchase request 208 does not include such information. In addition or alternatively, the sensitive information 118 may be replaced with different information that is added in place of the sensitive information 118. Thus, the data protection system 202 can be implemented to de-identify the sensitive information 118. In one specific example, the data protection system 202 replaces the sensitive information 118 (e.g., credit card information such as a credit card number, CVV, and expiration date) with an inscrutable token. The tokenization of the sensitive information relieves and/or reduces the requirement to meet security compliance (e.g., Payment Card Industry® Data Security Standards (PCI DSS)) with regard to the information at the eCommerce server 210.

Instead of requiring that a client application on the computing device 206 communicate with the payment service provider 212 directly, the data protection system 202 is implemented to manage communications with the payment service provider 212 on behalf of the client application and the eCommerce server 210. This in turn protects the client application on the computing device 206 from sending the sensitive information 118 directly to the payment service provider 212. This protection is provided by the data protection system 202 transparently such that the client application is not aware that the sensitive information 118 is being sent to the data protection system 202 rather than directly to the payment service provider 212.

Conventional data flows between the computing device 206 (via the client application 112 for instance), the eCommerce server 210, and the payment service provider 212 include sharing the sensitive information 118 that requires each of these entities to meet security compliance requirements. As illustrated in FIG. 2, the purchase request is sanitized by the data protection system 202 and as a result, the eCommerce server 210 is relieved of meeting at least some of the security compliance requirements and the client application avoids sending the sensitive information 118 directly to the payment service provider 212.

Figure 3:
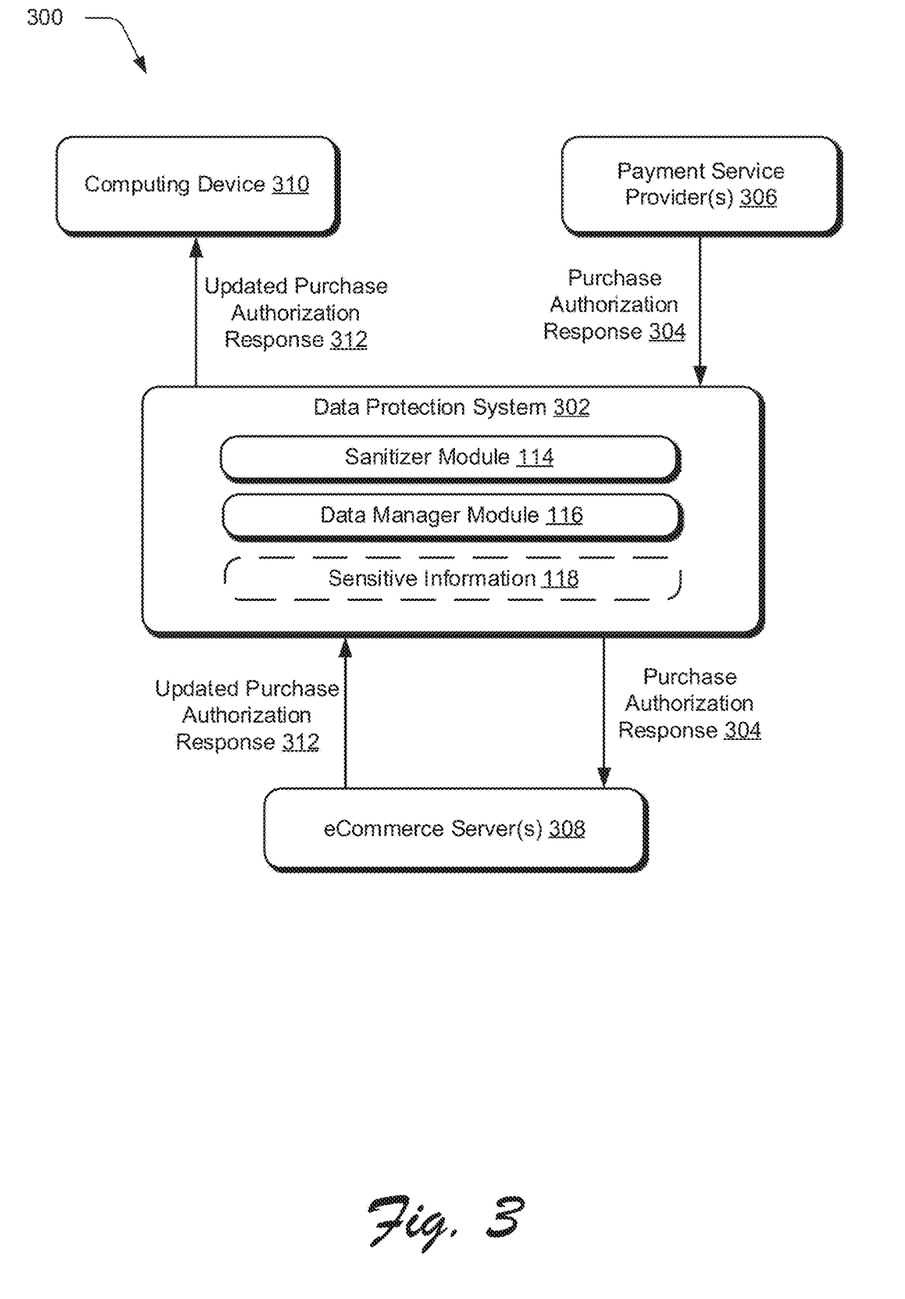
FIG. 3 depicts a representation of a scenario in an example implementation in which the data protection system sanitizes online purchase data and processes a purchase authorization.

FIG. 3 depicts generally at 300 a representation of a scenario in an example implementation in which the data protection system 302 sanitizes online purchase data and processes a purchase authorization. As represented in FIG. 3, a purchase authorization response 304 is received at the data protection system 302 from the payment service provider 306 and forwarded to the eCommerce server 308. The purchase authorization response 304 can include an indication of a confirmation or a denial of a purchase request. The data protection system 302 is communicatively located between the computing device 310, the eCommerce server 308, and the payment service provider 306. This enables the data protection system 302 to manage communications between these entities to sanitize and/or manage data associated with the communications.

In embodiments, the data protection system 302 is implemented to send the purchase authorization response 304 to the eCommerce server 308 unchanged as it was received from the payment service provider 306. However, in alternative implementations, the data protection system 302 is implemented to obfuscate sensitive information in the purchase authorization response 304 such that a modified purchase authorization response is provided to the eCommerce server 308. Here, the sensitive information can correspond to the sensitive information 118 previously removed by the data protection system 302 when sending a purchase authorization request to the payment service provider 306. Thus, sensitive information included in a response from the payment service provider 306 can be protected from the eCommerce server 308.

The illustrated environment 300 further includes receiving, at the data protection system 302, an updated purchase authorization response 312 from the eCommerce server 308. The updated purchase authorization response 312 is representative of a user-friendly confirmation or denial constructed by the eCommerce server 308 for the client application at the computing device 310. This response is received by the data protection system 302 and analyzed to determine whether sensitive information should be removed from storage. For instance, when a purchase request is processed, such as in the example described in FIG. 2, sensitive information 118 is stored in volatile memory at the data protection system 302. If the response indicates a denial of the purchase request, the sensitive information 118 may be stored until another attempt is made to authorize the purchase. Alternatively, if the response indicates a confirmation of the purchase request, the sensitive information 118 can be removed from storage at the data protection system 302. In this example, the time-duration for storage varies in accordance with a type of purchase authorization response. By limiting storage of sensitive information 118 at the data protection system 302 to short time-durations (e.g., measurable in seconds or milliseconds) and/or volatile memory, applicable security compliance requirements are reduced at one or more of the entities that would normally handle the sensitive information 118.

As illustrated in FIG. 3, the data protection system 302 facilitates requesting, communicating, and/or receiving purchase authorization for the online purchase data through the payment service provider 306, and does so without requiring changes to the payment service provider 306. In other words, implementing the data protection system 302 is transparent, or semi-transparent, to the payment service provider 306. In particular, instead of requiring that the computing device 310 communicate with the payment service provider 306 directly, the data protection system 302 is implemented to manage communications with the payment service provider 306 on behalf of the computing device 310 and the eCommerce server 308. This in turn protects the computing device 310 from sending sensitive information directly to the payment service provider 306. This protection is provided by the data protection system 302 transparently such that the computing device 310 is not aware that the sensitive information is being sent to the data protection system 302 rather than directly to the payment service provider 306.

Various actions such as receiving, sending, generating, identifying, analyzing, replacing, managing and so forth performed by various modules are discussed herein. It should be appreciated that the various modules may be configured in various combinations with functionality to cause these and other actions to be performed. Functionality associated with a particular module may be further divided among different modules and/or the functionality represented by multiple modules may be combined together into a single logical module. Moreover, a particular module may be configured to cause performance of action directly by the particular module. In addition or alternatively the particular module may cause particular actions by invoking or otherwise accessing other components or modules to perform the particular actions (or perform the actions in conjunction with that particular module). For instance, functionality provided by the data protection system 302 may be implemented by the eCommerce server 308 by including the sanitizer module 114 and the data manager module 116 as components of the eCommerce server 308.

Example Procedures

The following discussion describes data protection techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. Moreover, any one or more blocks of the procedure may be combined together or omitted entirely in different implementations. Moreover, blocks associated with different representative procedures and corresponding figures herein may be applied together. Thus, the individual operations specified across the various different procedures may be used in any suitable combinations and are not limited to the particular combinations represented by the example figures. In portions of the following discussion, reference may be made to the examples of FIGS. 1-3.

Figure 4:
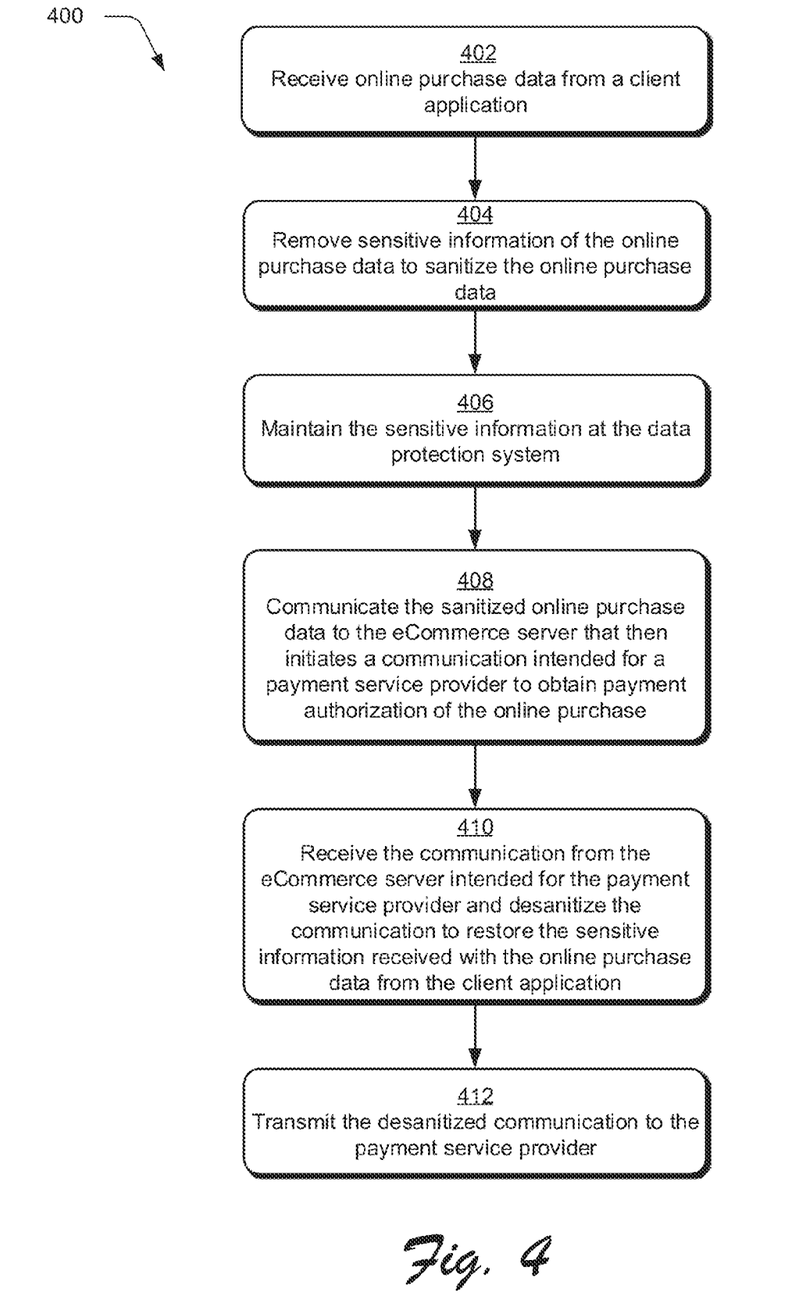
FIG. 4 is a flow diagram depicting a procedure for processing online purchase data by the data protection system.

FIG. 4 is a flow diagram depicting a procedure 400 for processing online purchase data by the data protection system. In at least some implementations, procedure 400 may be performed by a suitably configured computing device such as computing device 102 of FIG. 1 having a data protection system 104 or as described in relation to FIG. 6.

Online purchase data is received from a client application (block 402). For example, the data protection system 202 receives the sensitive information 118 in the form of the online purchase data 204 from the computing device 206. Sensitive information is removed to sanitize the online purchase data (block 404). For instance, the sanitizer module 114 of the data protection system 202 removes the sensitive information 118 from the online purchase data 204 to sanitize the online purchase data. The removed sensitive information is maintained at the data protection system 202 (block 406). For example, the data manager module 116 of the data protection system 202 initiates to maintain the sensitive information 118 in memory of the data protection system 202. The sensitive information 118 is stored until completion of a task associated with the online purchase data 202, such as receiving the purchase authorization response 304.

The sanitized online purchase data is communicated to the eCommerce server that then initiates a communication intended for a payment service provider to obtain payment authorization of the online purchase (block 408). For example, the data protection system 202 communicates the sanitized purchase data 208 to the eCommerce server 210, thereby relieving security compliance requirements at the eCommerce server 210. Because the eCommerce server 210 does not store or receive the sensitive information 118, security compliance requirements are relieved. In some implementations, the eCommerce server 210 initiates a communication intended for the payment service provider 212 by generating a purchase authorization request 214.

The communication from the eCommerce server intended for the payment service provider is received and desanitized to restore the sensitive information received with the online purchase data from the client application (410). For instance, the data protection system 202 receives the communication from the eCommerce server 210 intended for the payment service provider 212 in the form of the purchase authorization request 214. The data protection system 202 adds the sensitive information 118 to the purchase authorization request 214 to generate an updated purchase authorization request 216. By restoring the sensitive information 118 in the updated purchase authorization request 216, the purchase authorization request 214 is desanitized.

The desanitized communication is transmitted to the payment service provider (412). For instance, the data protection system 202 transmits the updated purchase authorization request 216 to the payment service provider 212. In implementations, the data protection system 202 provides the updated purchase authorization request 216 without requiring that the eCommerce server 210 and the payment service provider 212 be reconfigured to meet the security compliance requirements for the online purchase data. Thus, the data protection system 202 can be a 'drop-in' solution that does not require a business, program developer, or other entity to reconfigure the eCommerce server 210 or the payment service provider 212.

Figure 5:
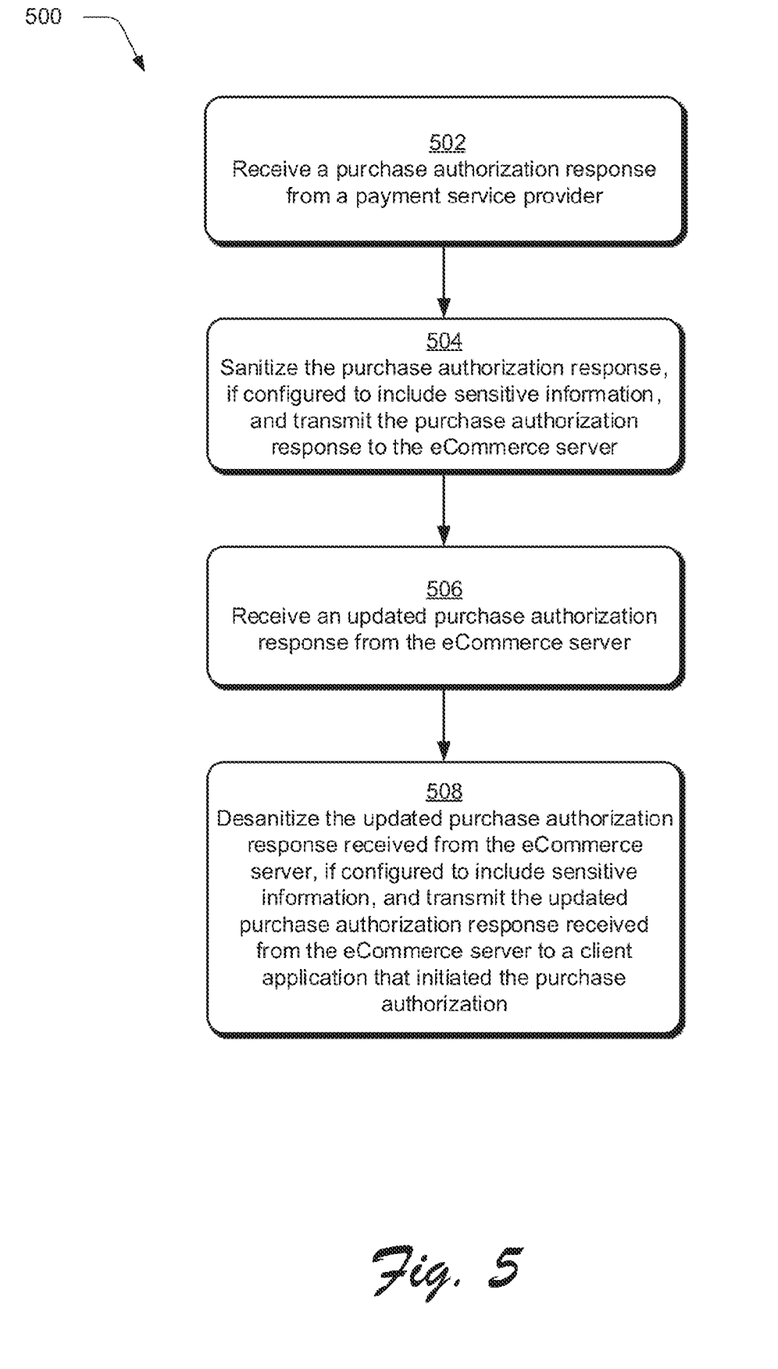
FIG. 5 is a flow diagram depicting a procedure for providing an updated purchase authorization by the data protection system.

Having considered an example procedure for processing online purchase data and a purchase authorization by the data protection system, consider now a procedure 500 in FIG. 5 for providing a updated purchase authorization by the data protection system. In at least some implementations, procedure 500 may be performed by a suitably configured computing device such as computing device 102 of FIG. 1 having a data protection system 302 or as described in relation to FIG. 6.

A purchase authorization response is received from a payment service provider (block 502). For instance, the data protection system 302 receives the purchase authorization response 304 in lieu of the payment service provider 306 sending the authorization response directly to the eCommerce server 308. In this way, the data protection system 302 can intercept purchase authorizations that in conventional systems would reach the eCommerce server 308.

The purchase authorization response is sanitized, if configured to include sensitive information, and transmitted to the eCommerce server (block 504). For example, the data protection system 302 transmits the purchase authorization response 304 to the eCommerce server 308 when the purchase authorization response 304 does not include the sensitive information 118. In this manner, the data protection system 302 can manage communications intended for the eCommerce server 308 on behalf of the payment service provider 306. In another example when the purchase authorization response 304 includes the sensitive information 118, the data protection system 302 sanitizes the purchase authorization response 304 prior to transmitting it to the eCommerce server 308 to de-identify the sensitive information 118 in the purchase authorization response 304.

An updated purchase authorization response is received from the eCommerce server (block 506). For example, the data protection system 302 receives the updated purchase authorization response 312 that is representative of a user-friendly confirmation or denial constructed by the eCommerce server 308. The updated purchase authorization response 312 does not include the sensitive information 118.

The updated purchase authorization response is desanitized, if configured to include sensitive information, and transmitted from the eCommerce server to a client application that initiated the purchase authorization (block 508). For example, the data protection system 302 transmits the updated purchase authorization response 312 for presentation at the computing device 310 when the updated purchase authorization response 312 is not configured to include sensitive information. A determination of whether the updated purchase authorization response 312 is configured to include sensitive information can be based on the purchase authorization response 304 from the payment service provider 306. That is, in implementations when the purchase authorization response 304 includes sensitive information 118, and the response is sanitized as described in block 504, then the data protection system 302 desanitizes the updated purchase authorization response 312 such that the sensitive information 118 is added and/or restored in the purchase authorization response transmitted by the data protection system 302 to the client application that initiated the purchase authorization. Alternatively, in implementations when the purchase authorization response 304 received at the data protection system 302 from the payment service provider 306 does not include sensitive information 118, desanitizing is not required to be performed by the data protection system 302.

Example System and Device

Figure 6:
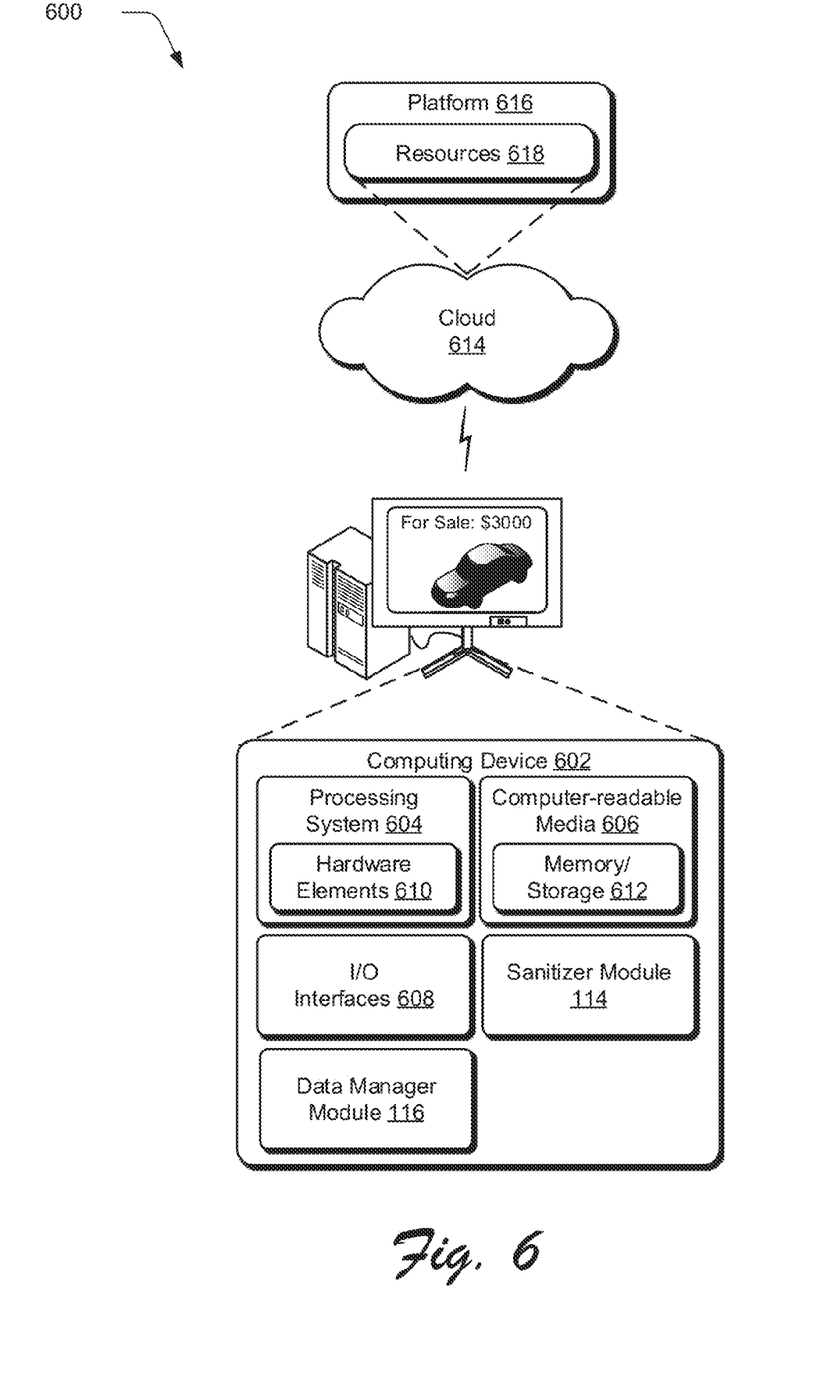
FIG. 6 illustrates an example system including an example device that is representative of one or more computing systems and/or devices that may implement the various techniques described herein.

FIG. 6 illustrates an example system 600 that, generally, includes an example computing device 602 that is representative of one or more computing systems and/or devices that may implement the various techniques described herein. This is illustrated through inclusion of the sanitizer module 114 and the data manager module 116. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors, e.g., electronic integrated circuits (ICs). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media, e.g., Flash memory, a removable hard drive, an optical disc, and so forth. The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in one or more embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

Conclusion

Although the techniques have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter, and other equivalent features and methods are intended to be within the scope of the appended claims. Further, various different embodiments are described and it is to be appreciated that each described embodiment can be implemented independently or in connection with one or more other described embodiments.

What is claimed is:

1. A data protection system communicatively located between a client application and an eCommerce server for removing sensitive information associated with an online purchase, the data protection system configured to:
    intercept online purchase data from the client application;
    remove the sensitive information of the online purchase data to sanitize the online purchase data;
    maintain the sensitive information in a volatile memory of the data protection system to reincorporate the sensitive information with the online purchase data in a communication to a payment service provider;
    communicate the sanitized online purchase data to the eCommerce server that then initiates the communication intended for the payment service provider to obtain payment authorization of the online purchase, the sanitized online purchase data relieving security compliance requirements at the eCommerce server; and
    remove the sensitive information from the volatile memory of the data protection system after the payment authorization is received from the payment service provider.

2. The data protection system as described in claim 1, wherein the data protection system is further configured to communicate with the payment service provider on behalf of the eCommerce server by operating as an intermediary between the payment service provider and the eCommerce server.

3. The data protection system as described in claim 1, wherein the sanitized online purchase data relieves the security compliance requirements at the eCommerce server by lacking the sensitive information that is subject to the security compliance requirements.

4. The data protection system as described in claim 1, wherein the data protection system is further configured to:
    receive the communication from the eCommerce server intended for the payment service provider to obtain the payment authorization of the online purchase, the communication received from the eCommerce server identifying the sanitized online purchase data;
    add the sensitive information to the communication received from the eCommerce server;
    replace the communication received from the eCommerce server with an updated communication for payment authorization that includes the sensitive information; and
    communicate the updated communication that includes the sensitive information to the payment service provider for the payment authorization.

5. The data protection system as described in claim 1, wherein the data protection system is further configured to receive the communication intended for the payment service provider from the eCommerce server and desanitize the communication to restore the sensitive information of the online purchase data, the desanitized communication including the restored sensitive information that enables the payment service provider to authorize or deny the online purchase responsive to the data protection system transmitting the desanitized communication to the payment service provider.

6. The data protection system as described in claim 5, wherein the communication received from the eCommerce server includes the sanitized online purchase data without the sensitive information needed for the payment service provider to authorize the online purchase.

7. The data protection system as described in claim 1, wherein the sensitive information of the online purchase data includes credit card information comprising at least a credit card number and an expiration date for the credit card number.

8. The data protection system as described in claim 1, wherein to remove the sensitive information of the online purchase data to sanitize the online purchase data, the data protection system is configured to replace the sensitive information with a tokenized representation of the sensitive information.

9. The data protection system as described in claim 1, wherein the security compliance requirements include Payment Card Industry® Data Security Standards (PCI DSS) that govern the online purchase and are applicable to the client application, the payment service provider, and the eCommerce server.

10. A server computing device that implements a web service for securing online purchase data subject to security compliance requirements for an online purchase, the server computing device comprising:
one or more processors; and
memory, communicatively coupled to the one or more processors, storing instructions that, responsive to execution by the one or more processors, causes the web service to implement operations comprising:
intercepting the online purchase data communicated from a client application that initiates the online purchase;
removing sensitive information to sanitize the online purchase data prior to the online purchase data being communicated to a content provider involved in the online purchase;
storing the sensitive information in a volatile memory of the server computing device to reincorporate the sensitive information with the online purchase data in a communication to a third party service;
communicating the sanitized online purchase data to the content provider;
providing payment authorization for the online purchase data based, at least in part, on receiving a response from the third party service, the payment authorization being provided without requiring that the content provider or the third party service be reconfigured to meet the security compliance requirements for the online purchase data; and
removing the sensitive information from the volatile memory of the server computing device after the payment authorization is received from the third party service.

11. The server computing device as described in claim 10, wherein the payment authorization is determined without requiring that the client application used to initiate the online purchase forward the online purchase data to the third party service.

12. The server computing device as described in claim 10, wherein the payment authorization is determined without requiring that the client application, the content provider, and the third party service be reconfigured to meet the security compliance requirements.

13. The server computing device as described in claim 10, wherein the content provider includes an eCommerce server and the third party service includes a payment service provider, and wherein the security compliance requirements include Payment Card Industry® Data Security Standards (PCI DSS) that govern the online purchase and are applicable to the client application, the payment service provider, and the eCommerce server.

14. The server computing device as described in claim 10, wherein the processing the online purchase data to sanitize the online purchase data from at least the content provider includes removing sensitive credit card data from the online purchase data such that the sensitive credit card data is not received at the content provider.

15. The server computing device as described in claim 10, wherein the web service is communicatively located between the client application and the content provider to intercept the online purchase data being sent from the client application, and wherein the web service is communicatively located between the content provider and the third party service to intercept the purchase authorization sent from the third party service.

16. A method implemented by a data protection system to remove sensitive information associated with an online purchase, the method comprising:
intercepting online purchase data from a client application;
removing the sensitive information of the online purchase data to sanitize the online purchase data;
maintaining the sensitive information in a volatile memory of the data protection system to reincorporate the sensitive information with the online purchase data in a communication to a payment service provider;
communicating the sanitized online purchase data to a eCommerce server that then communicates with a payment service provider for payment authorization of the online purchase, the sanitized online purchase data relieving security compliance requirements at the eCommerce server; and
removing the sensitive information from the volatile memory of the data protection system after the payment authorization is received from the payment service provider.

17. The method as described in claim 16, wherein the data protection system is communicatively located between the eCommerce server and the payment service provider to direct the purchase authorization sent from the payment service provider through the eCommerce server to the client application from which the online purchase data is received.

18. The method as described in claim 16, further comprising preventing the client application from forwarding the online purchase data with the sensitive information to the eCommerce server or to the payment service provider.

19. The method as described in claim 16, further comprising maintaining the sensitive information at the data protection system in the volatile memory for a time duration that corresponds to a length of time to complete the online purchase.

20. The data protection system as described in claim 1, wherein the payment authorization is determined without requiring the client application, the eCommerce server, or the payment service provider being reconfigured to meet the security compliance requirements.

* * * * *